Feb. 28, 1967   R. RODIER   3,305,882
DESIGNATED LENGTH THREADING TOOL
Filed Aug. 14, 1964

INVENTOR
Raymond Rodier

BY
Albert Gordon
ATTORNEY

United States Patent Office 3,305,882
Patented Feb. 28, 1967

3,305,882
DESIGNATED LENGTH THREADING TOOL
Raymond Rodier, 165 Glezen Lane,
Wayland, Mass. 01778
Filed Aug. 14, 1964, Ser. No. 389,651
15 Claims. (Cl. 10—89)

This invention is concerned with a tool for cutting a spiral thread in a bar that is so constructed that, when adjusted for a particular length of thread, it will uniformly and accurately cut such a length of thread on each bar presented to the tool.

The tool includes a die body and a die head that is mounted on the body. The die head is normally clutched to the die body so as to be non-rotatable with respect to the die body and can rotate with respect to the die body when moved away from the die body a sufficient distance to release the clutch. A conventional threading die having spirally arranged cutting teeth is mounted on the die head forwardly of the die body and a limit stop is mounted on the die body in alignment with the threading die. When relative rotation is imparted to a bar presented to the die and the tool, the bar is caused to have relative rearward movement with respect to the die into the die body until the bar engages the limit stop at which time the die head moves forwardly relative to the die body and rotates with respect to the die body and the threading operation is concluded.

Figure 1:
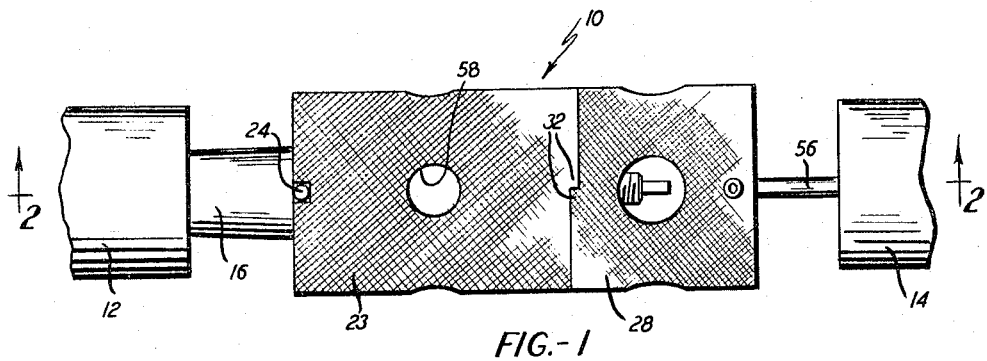
Figure 2:
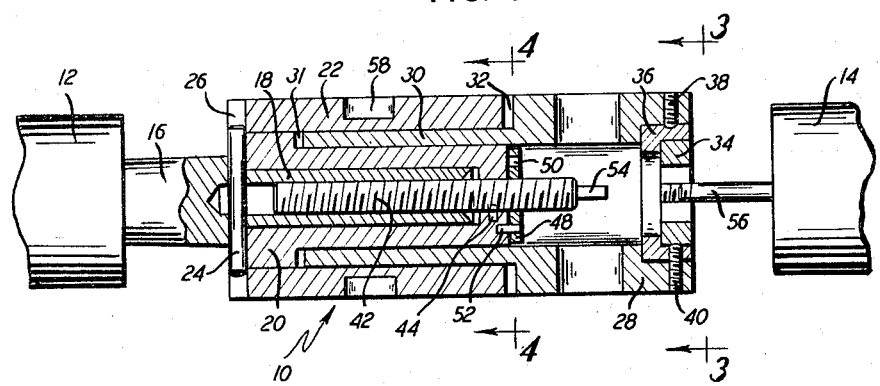
Figure 3:
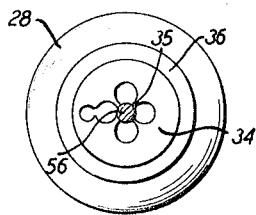
Figure 4:
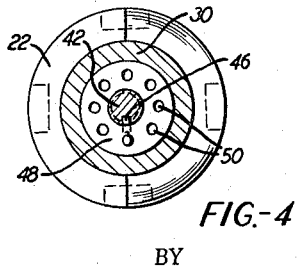

In the drawing:
FIG. 1 is a side view of the tool;
FIG. 2 is a section taken on the line 2—2 of FIG. 1;
FIG. 3 is a view taken on the line 3—3 of FIG. 2; and
FIG. 4 is a view taken on the line 4—4 of FIG. 2.

The threading tool 10 is used in conjunction with the tail stock 12 and head stock 14 of a lathe. The lathe has conventional means for moving the tail stock 12 toward and away from the head stock 14 and for rotating the head stock about the axis extending through the center lines of the head stock and tail stock.

Hereafter, the direction extending toward the head stock 14 will be designated as "forward" and the direction extending toward the tail stock 12 will be designated as "rearward."

The tool 10 includes a shank 16 that is mountable in the usual tapered spindle of the tail stock 12. A cylindrical extension 18 of the shank 16 is slidably fitted into an inner sleeve 20. A knurled outer sleeve 22 is press fitted onto the inner sleeve 20. The sleeves 20 and 22 constitute a die body 23. A removable pin 24 secured in the shank extension 18 extends radially outwardly of the shank extension and is adapted to be seated in aligned grooves 26 in the sleeves 20 and 22. A hollow knurled die head 28 has an annular extension 30 that is slidably received in an annular space 31 between the sleeves 20 and 22. The adjoining end faces of the outer sleeve 22 and die head 28 are formed into teeth 32 that serve as a clutch to normally lock the die body and die head for rotation in unison.

A conventional threading die 34 having spiralled cutting teeth 35 is mounted on the forward end of the die head 28. Preferably, an adapter 36 is seated in a recess in the die head 28 by a set screw 38 and the die 34 is seated in a recess in the adapter 36 by a set screw 40 that is threaded into the die head and extends through the adapter to bear against the die.

A threaded stud 42 is slidably received in the shank extension 18 and the forward end of the inner sleeve 20. A pin 44 is secured to the sleeve 20 and extends inwardly thereof into a longitudinal groove 46 to spline the stud 42 against rotation. A knurled collar 48, threaded onto the stud 42, has a plurality of uniformly spaced apertures 50 extending therethrough that are equidistant from the stud. A pin 52 is secured to the inner sleeve 20 and extends forwardly thereof and is receivable in a selected aperture 50. A limit-stop in the form of a stem 54 is integral with and extends forwardly of the stud 42.

In the operation of the threading tool 10, the collar 48 is moved on the stud 42 until the collar is a desired distance from the forward end of the stem 54. The stud is then moved rearwardly into the inner sleeve 20 with the pin 44 riding in the groove 46 until the pin 52 engages within one of the apertures 50. This serves to position the stem 54 a predetermined distance from the die 34 and thus determine the length of thread cut into a bar 56 to be threaded for reasons given below. If it is desired to change the length of thread to be cut, the collar 48 is moved to another position on the stud 42 and the pin 52 is caused to engage the aperture 50 that is commensurate with this new position. A threading die 34 that is appropriate to the diameter of the bar 56 and to the type of thread to be threaded is secured in the adapter 36. The remainder of the parts of the tool 10 are assembled as indicated in FIG. 2. The bar 56 to be threaded is secured in the conventional chuck of the head stock 14.

Initially the tail stock 12 is in a rearward position so that the die 34 is spaced from the bar 56. The head stock 14 is caused to rotate the bar 56 and the tail stock 12 is moved forwardly to cause the die 34 to engage the bar 56 and start to cut a spiral thread into the bar. The cutting engagement of the die with the rotating bar 56 as well as the continued forward movement of the tail stock 12 causes the tool 10 to continue to move forwardly and cut the thread on the bar with the pin and groove connection 24, 26 preventing rotation of the sleeves 20 and 22 about the shank extension 18 and the teeth 32 preventing rotation of the die head 28 with respect to the sleeves 20 and 22. When the bar 56 engages the stem 54 the sleeves 20 and 22 can no longer move forwardly so that the cutting engagement of the rotating bar 56 in the die 34 causes the die head 28 to move forwardly of the outer sleeve 22 with the teeth 32 disengaging so that the die head 28 rotates with the bar 56 and the thread cutting operation is terminated. At this point the operator stops the forward movement of the tail stock 12 and the rotation of the head stock 14. To return the tool parts to their initial position the operator reverses the direction of rotation of the head stock 14 which moves the tail stock 12 rearwardly.

As an alternative mode of operation of the tool 10, the pin 24 may be removed from the tool. In this case, the tail stock 12 is moved forwardly until the die 34 engages the rotating bar 56 and is then stopped. The operator grasps the outer sleeve 22 to guide it, and the cutting engagement of the bar 56 in the cutting teeth of the die 34 causes the die body 23 and the die head 28 to move forwardly with the teeth 32 engaged and the inner sleeve 20 sliding forwardly on the shank extension 18 until the bar 56 engages the stem 54. As described above, the engagement of the rotating bar 56 with the stem 54 causes the die head 28 to move forwardly of the sleeve 22 until the teeth 32 disengage whereupon the die head 28 rotates with the bar 56 and the thread cutting operation is completed. The operator now reverses the rotation of the head stock 14 to cause the parts of the tool 10 to return to their original position and release the bar 56 and moves the tail stock 12 back to its original position.

While the limit stop for the tool has been shown as taking the form of the adjustable stud 42, it should be understood that other forms of limit stops may be used. For example, a stem of fixed length may be inserted in the inner sleeve 20 in place of the stud 42.

While the bar 56 has been described as rotating and the tool 10 has been described as moving forwardly, it should be apparent that these movements need only be relative. For example, the tool may perform its function equally well if the tool 10 were to rotate and the bar 56 moved rearwardly into the tool.

When cutting threads on relatively large diameter bars, it is sometimes desirable to rotate the die body 23 and die head 28 by hand. To accomplish this the outer sleeve 22 is provided with holes 58 which may receive an appropriate tool for enabling the operator to manually rotate the die body.

I claim:

1. A threading tool comprising: a die body; a die head mounted on the body for movement forwardly of the body and for rotation with respect to the body; clutch means on the die body and die head so constructed and arranged as to preclude rotation of the die head with respect to the die body when the die head is in a rearward position juxtaposed to the die body and to permit rotation of the die head with respect to the die body when the die head is in a forward position spaced from the die body; a threading die on the die head located forwardly of the die body; a limit stop comprising a stud mounted in the die body for movement toward and away from the threading die and extending forwardly of the die body in alignment with the threading die; a collar mounted on the stud forwardly of the die body for forward and rearward adjustment of the stud; and means for removably attaching the collar to the front of the die body.

2. The tool as defined in claim 1 further comprising: means for preventing rotation of the stud with respect to the die body.

3. The tool as defined in claim 1 wherein the collar is threaded onto the stud.

4. The tool as defined in claim 3 wherein the collar has a plurality of apertures therein that are equidistant from the axis of the stud; and the removable attaching means comprises a pin extending forwardly from the die body into a selected aperture.

5. The tool as defined in claim 4 further comprising: means for preventing rotation of the stud with respect to the die body.

6. An adjustable connection for causing a stud to project a desired distance away from a body comprising: a body having an aperture therein; a threaded stud, having a maximum diameter smaller than the diameter of the aperture, mounted in the aperture for free longitudinal movement; a collar threaded onto the stud; a plurality of apertures in the collar that are equidistant from the axis of the stud; and a pin extending from the body into a selected aperture.

7. The connection as defined in claim 6 further comprising: means for preventing rotation of the stud with respect to the body.

8. A threading tool comprising: a shank; a die body mounted on the shank for forward and rearward movement with respect to the shank; a die head movably mounted on the body for movement forwardly of the body and for rotation with respect to the body; clutch means on the die body and die head so constructed and arranged as to preclude rotation of the die head with respect to the die body when the die head is in a rearward position juxtaposed to the die body and to permit rotation of the die head with respect to the die body when the die head is in a forward position spaced from the die body; a threading die on the die head located forwardly of the die body; and a limit-stop mounted in the die body extending forwardly thereof in alignment with the threading die.

9. The tool as defined in claim 8 wherein the limit-stop and its mounting comprises: a threaded stud mounted in the body and shank for movement toward and away from the die; a collar threaded onto the stud; and means for removably attaching the collar to the body.

10. The tool as defined in claim 9 wherein the collar has a plurality of apertures therein that are equidistant from the axis of the stud, and the removable attaching means comprises a pin extending forwardly from the die body into a selected aperture.

11. The tool as defined in claim 10 further comprising: means for preventing rotation of the stud with respect to the die body.

12. The tool as defined in claim 8 wherein the die body is mounted in the shank for rotation with respect to the shank, and further comprising: a removable connector for locking the shank and die body against relative rotation.

13. The tool as defined in claim 12 wherein said removable connector comprises a pin extending through said shank and extending outwardly thereof and further comprising grooves in the rear of the die body in which the pin is received.

14. The tool as defined in claim 8 wherein the limit-stop and its mounting comprises a stud mounted in the body and shank for movement toward and away from the threading die; a collar mounted on the stud forwardly of the die body for forward and rearward adjustment; and means for removably attaching the collar to the die body.

15. The tool as defined in claim 14 further comprising: means for preventing rotation of the stud with respect to the die body.

References Cited by the Examiner

UNITED STATES PATENTS

| | | | |
|---|---|---|---|
| 930,148 | 8/1909 | Brown | 151—67 |
| 1,641,438 | 9/1927 | Jones | 74—10.85 X |
| 2,569,826 | 10/1951 | Packard | 141—67 X |
| 2,635,260 | 4/1953 | Chapin | 10—89 |

FOREIGN PATENTS

| | | |
|---|---|---|
| 1,017,162 | 9/1952 | France. |
| 116,338 | 4/1946 | Sweden. |

OTHER REFERENCES

Hartmann, The Machinist, vol. 99, No. 12, page 600.

ANDREW R. JUHASZ, *Primary Examiner.*